United States Patent
Tsai et al.

(10) Patent No.: US 12,393,078 B2
(45) Date of Patent: Aug. 19, 2025

(54) LIGHT DIFFUSION SHEET, LIGHT DIFFUSION SHEET LAMINATE, BACKLIGHT UNIT, AND LIQUID CRYSTAL DISPLAY DEVICE

(71) Applicant: KEIWA INCORPORATED, Tokyo (JP)

(72) Inventors: Chengheng Tsai, Tokyo (JP); Satoshi Shiba, Tokyo (JP); Yu Kariya, Tokyo (JP)

(73) Assignee: KEIWA INCORPORATED, Tokyo (JP)

( * ) Notice: Subject to any disclaimer, the term of this patent is extended or adjusted under 35 U.S.C. 154(b) by 0 days.

(21) Appl. No.: 18/564,130

(22) PCT Filed: May 27, 2022

(86) PCT No.: PCT/JP2022/021737
§ 371 (c)(1),
(2) Date: Nov. 27, 2023

(87) PCT Pub. No.: WO2022/259890
PCT Pub. Date: Dec. 15, 2022

(65) Prior Publication Data
US 2024/0248346 A1    Jul. 25, 2024

(30) Foreign Application Priority Data

Jun. 10, 2021 (JP) .................................. 2021-097155
May 11, 2022 (JP) .................................. 2022-078307

(51) Int. Cl.
*G02F 1/13357* (2006.01)
*G02B 5/02* (2006.01)

(52) U.S. Cl.
CPC .. *G02F 1/133606* (2013.01); *G02F 1/133603* (2013.01); *G02B 5/0215* (2013.01); *G02B 5/0231* (2013.01); *G02B 5/0278* (2013.01)

(58) Field of Classification Search
None
See application file for complete search history.

(56) References Cited

U.S. PATENT DOCUMENTS 7,802,895 B2   9/2010   Suzuki et al.
10,454,411 B2  10/2019  Satoh et al.
(Continued)

FOREIGN PATENT DOCUMENTS

CN    202209593 U   5/2012
JP    11-30708 A    2/1999
(Continued)

OTHER PUBLICATIONS

International Search Report issued Aug. 9, 2022 in PCT/JP2022/021737 filed on May 27, 2022, 2 pages.
(Continued)

*Primary Examiner* — Richard H Kim
(74) *Attorney, Agent, or Firm* — Oblon, McClelland, Maier & Neustadt, L.L.P.

(57) ABSTRACT

One aspect of the present invention is a light diffusion sheet having a first surface on which a plurality of recesses that diffuse light are formed, and a second surface on which a plurality of projections that can transmit light are provided apart from each other.

12 Claims, 10 Drawing Sheets

(56) References Cited

U.S. PATENT DOCUMENTS

| | | |
|---|---|---|
| 2008/0130117 A1 | 6/2008 | Hsu et al. |
| 2010/0033957 A1 | 2/2010 | Lin |
| 2016/0011339 A1* | 1/2016 | Namikawa ............ G02B 5/0226 |
| | | 428/207 |
| 2017/0329066 A1* | 11/2017 | Harada ................. G02B 5/0294 |
| 2020/0341335 A1 | 10/2020 | Tsai et al. |
| 2021/0286215 A1* | 9/2021 | Jang .................. G02F 1/133603 |
| 2022/0004058 A1 | 1/2022 | Tsai et al. |
| 2022/0179264 A1* | 6/2022 | Chen ................. G02F 1/133603 |
| 2022/0326571 A1 | 10/2022 | Tsai et al. |

FOREIGN PATENT DOCUMENTS

| | | |
|---|---|---|
| JP | 2008-139878 A | 6/2008 |
| JP | 2009-98566 A | 5/2009 |
| JP | 2011-133555 A | 7/2011 |
| JP | 2013-214378 A | 10/2013 |
| JP | 2017-207736 A | 11/2017 |
| JP | 2020-79920 A | 5/2020 |
| KR | 10-2014-0064677 A | 7/2014 |
| KR | 10-2020-0109740 A | 9/2020 |
| TW | 200825549 A | 6/2008 |

OTHER PUBLICATIONS

Official Office Action in Corresponding Taiwanese Patent Application No. 111120418 issued Mar. 13, 2023, 8 pages (with English Summary).

Official Office Action in Corresponding Japanese Patent Application 2022-078307 A issued Oct. 5, 2023, 6 pages (with English Translation).

Office Action issued May 28, 2025, in corresponding European Patent Application No. 22820072.1, citing documents 1 and 15-17 therein, 8 pages.

* cited by examiner

LIGHT DIFFUSION SHEET, LIGHT DIFFUSION SHEET LAMINATE, BACKLIGHT UNIT, AND LIQUID CRYSTAL DISPLAY DEVICE

TECHNICAL FIELD

The present invention relates to a light diffusion sheet, a light diffusion sheet laminate, a backlight unit, and a liquid crystal display device.

BACKGROUND ART

Liquid crystal display devices (liquid crystal displays) are widely used as display devices in various information devices such as smartphones and tablet terminals. Examples of a backlight unit used for a liquid crystal display include a direct method in which a plurality of light sources are disposed on the back surface side of a liquid crystal panel, and an edge-light method in which light sources are disposed in the vicinity of a side surface of a liquid crystal panel.

A backlight unit used for a liquid crystal display includes an optical sheet for converting light emitted from a light source into light suitable for the liquid crystal display. Examples of such an optical sheet include a light diffusion sheet that diffuses light emitted from a light source. Since the backlight unit includes the light diffusion sheet, the backlight unit can diffuse light emitted from the light source to enhance uniformity (in-plane uniformity) of luminance and the like in a region (display screen) in which an image is displayed on the liquid crystal display.

Examples of such an optical sheet include the optical sheet described in Patent Literature 1. Patent Literature 1 discloses an optical sheet used for illumination light path control in a backlight unit for a display, the optical sheet including: at least one type of unit lens or unit prism disposed along in a large number on an exit surface; and a rugged shape in which projections projecting on an entrance surface and recesses which are regions sandwiched by the projections and are lower in height than the projections, the projections and the recesses being arranged in a large number alternately. The recesses on the entrance surface are arranged at positions corresponding to a light condensing shape of parallel light which is made to enter through the unit lens or the prism provided on the exit surface and the projections are provided with a light reflection layer formed on the entire surface of the projections including the top part and the side parts of the projections, which are regions sandwiched by boundaries between the projections and the recesses.

Patent Literature 1 discloses that an optical sheet that exhibits high light utilization efficiency when used in a backlight unit can be provided. The optical sheet described in Patent Literature 1 is not a sheet intended to enhance in-plane uniformity of luminance or the like in a backlight by diffusing light, but is a sheet to be used together with a light diffusion sheet.

Liquid crystal displays are required to be reduced in thickness. In order to realize the thickness reduction of a liquid crystal display, the distance from a light source to a light diffusion sheet may be shortened, or an optical sheet such as a light diffusion sheet may be thinned. In such a case, diffusion of light by the light diffusion sheet tends to be insufficient. In addition, for example, a direct method backlight unit is often used with a plurality of light emitting diode (LED) elements dotted as the light source. In a region (display screen) in which an image is displayed in a liquid crystal display, unevenness in luminance or the like tends to occur between a portion directly below which an LED element is present and a portion where no LED element is present. In a case where the diffusion of light by a light diffusion sheet is insufficient, this tendency becomes remarkable. In order to further reduce such luminance unevenness, the light diffusion sheet provided in the backlight unit is required to be capable of more suitably diffusing light. In addition, the backlight unit is required to have higher in-plane uniformity of luminance or the like by including the light diffusion sheet or the like. When the thickness of the light diffusion sheet is increased to enhance in-plane uniformity of luminance or the like, this not only fails to contribute to thinning of the liquid crystal display described above, but also may reduce the luminance. For these reasons, the light diffusion sheet provided in the backlight unit is required to be capable of inhibiting a decrease in the luminance of transmitted light and also enhancing in-plane uniformity of the luminance.

CITATION LIST

Patent Literature

Patent Literature 1: JP-A-2009-98566

SUMMARY OF INVENTION

The present invention has been made in view of such circumstances, and an object of the present invention is to provide a light diffusion sheet capable of sufficiently inhibiting a decrease in the luminance of transmitted light and also enhancing in-plane uniformity of the luminance. Another object of the present invention is to provide a light diffusion sheet laminate in which the light diffusion sheet is laminated, a backlight unit including the light diffusion sheet, and a liquid crystal display device including the backlight unit.

One aspect of the present invention is a light diffusion sheet having a first surface on which a plurality of recesses that diffuse light are formed, and a second surface on which a plurality of projections that can transmit light are provided apart from each other.

The foregoing and other objects, features, and advantages of the present invention will become apparent from the following detailed description.

DESCRIPTION OF EMBODIMENTS

As a result of various studies, the present inventors have found that the above objects are achieved by the present invention described below.

Hereinafter, an embodiment of the present invention will be described, but the present invention is not limited thereto.
[Light Diffusion Sheet]

Figure 1:
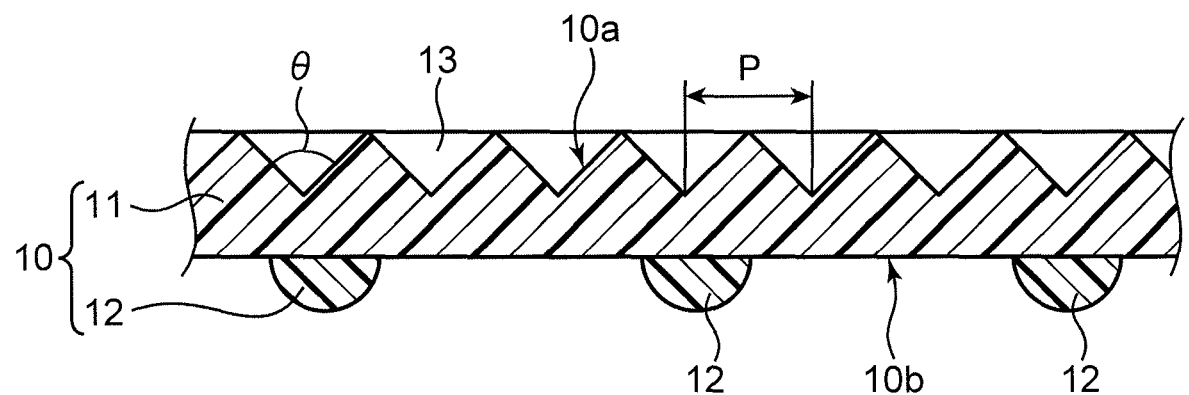
FIG. 1 is a schematic sectional view illustrating a light diffusion sheet according to an embodiment of the present invention.
Figure 2:
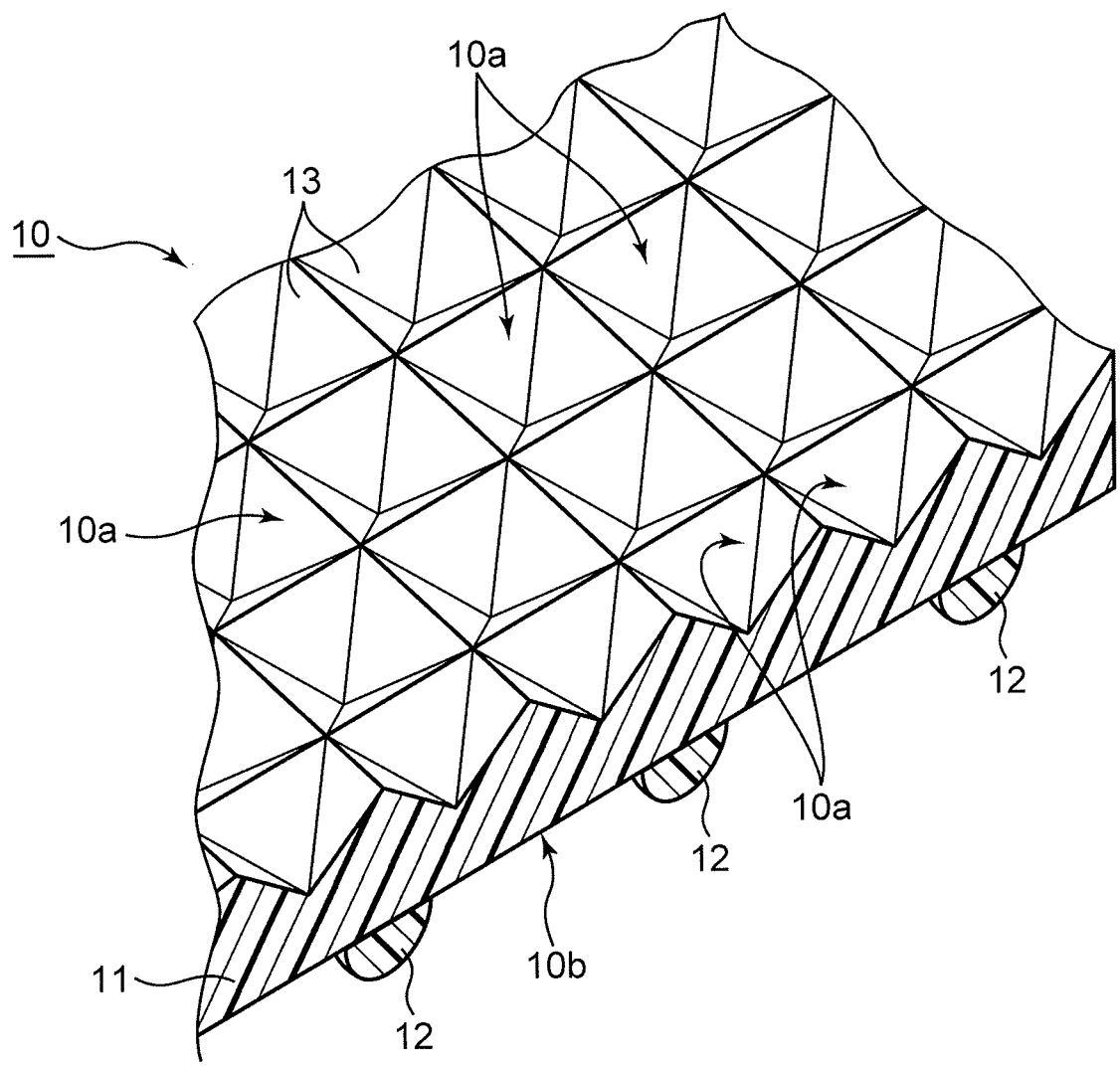
FIG. 2 is a schematic perspective view illustrating the light diffusion sheet according to the embodiment of the present invention.

As illustrated in FIGS. 1 and 2, the light diffusion sheet 10 according to the present embodiment has a first surface 10*a* on which a plurality of recesses 13 that diffuse light are formed, and a second surface 10*b* on which a plurality of projections 12 that can transmit light are provided apart from each other. The light diffusion sheet 10 can allow light to both enter and exit through the second surface 10*b*. In the case of making light enter through the second surface 10*b*, the light having entered through the second surface 10*b* reaches the first surface 10*a* and can be uniformly diffused by the recesses 13 formed in the first surface 10*a*. In the case of making light enter through the first surface 10*a*, the light that enters through the first surface 10*a* is uniformly diffused by the recesses formed in the first surface 10*a*, the diffused light reaches the second surface 10*b*, and the uniformly diffused light is emitted through the second surface 10*b*. In the light diffusion sheet 10, since the plurality of projections 12 are provided apart from each other on the second surface 10*b*, even if another sheet is disposed adjacent to the light diffusion sheet 10 on the second surface 10*b*, the light diffusion sheet 10 and the other sheet are apart from each other. That is, an air layer can be suitably formed between the light diffusion sheet 10 and the other sheet. The light diffusion sheet 10 includes the plurality of projections 12 provided apart from each other on the second surface 10*b* as described above, whereby the diffusibility of light transmitted through the light diffusion sheet 10 can be enhanced, a decrease in the luminance of the transmitted light can be sufficiently inhibited, and also in-plane uniformity of the luminance can be enhanced. FIG. 1 is a schematic sectional view illustrating a light diffusion sheet 10 according to the present embodiment. FIG. 2 is a schematic perspective view illustrating the light diffusion sheet 10 according to the present embodiment.

The light diffusion sheet 10 can be used as, for example, an optical sheet to be included in a backlight unit to be included in a liquid crystal display device. Specifically, the light diffusion sheet 10 can be used as an optical sheet provided in a backlight unit to be included in a liquid crystal display device such that the second surface 10*b* is arranged facing toward a plurality of light sources provided in the backlight unit. The light diffusion sheet 10 can also be used as an optical sheet provided such that the first surface 10*a* is arranged facing toward a plurality of light sources provided in the backlight unit.

The light diffusion sheet 10 is not particularly limited as long as it is a sheet having the first surface 10*a* and the second surface 10*b*. The light diffusion sheet 10 may be, for example, a sheet having the first surface 10*a* and the second surface 10*b* in the same layer (that is, a sheet in which the layer with the plurality of recesses formed and the projections are integrated). Furthermore, the light diffusion sheet 10 may be, for example, a sheet including a body portion 11 in which the plurality of recesses 13 are formed, and the plurality of projections 12 arranged on a surface of the body portion 11 on the side opposite from the side where the plurality of recesses 13 are formed as illustrated in FIGS. 1 and 2. As long as the light diffusion sheet 10 has the first surface 10*a* and the second surface 10*b*, the light diffusion sheet may be a sheet including the body portion 11 and the projections 12 as described above, or may be a sheet including the body portion 11 and the projections 12 and also including one or more layers other than them (namely, another layer or other layers) (namely, a sheet including three or more layers), for example, a sheet including another layer or other layers between the body portion 11 and the plurality of projections 12.

The first surface 10*a* is a surface in which the plurality of recesses 13 for diffusing light are formed. In the case of a sheet in which a layer in which the plurality of recesses 13 are formed and the projections are integrated, the first surface 10*a* constitutes one surface of the sheet. In the case of a sheet including the body portion 11 and the plurality of projections 12 as illustrated in FIGS. 1 and 2, the first surface 10*a* constitutes a surface of the body portion 11 on the side opposite from the surface on which the plurality of projections 12 are provided.

The recesses 13 are not particularly limited as long as they can diffuse light having entered through the first surface 10*a* or light having entered through the second surface 10*b* and having reached the first surface 10*a*, and are preferably, for example, substantially inverted polygonal pyramidal recesses. The substantially inverted polygonal pyramidal recess is not particularly limited as long as it can diffuse light, and for example, a recess having a shape with which recesses can be two-dimensionally arranged with no gap or with a little gap, such as a substantially inverted triangular pyramidal shape, a substantially inverted quadrangular pyramidal shape, or a substantially inverted hexagonal pyramidal shape, is more preferable. Further, the substantially inverted polygonal pyramidal recess is more preferably, for example, a substantially inverted quadrangular pyramidal (inverted pyramidal) recess as illustrated in FIG. 2. In addition, the apex angle θ of the recess 13 is not particularly limited as long as light can be diffused, and is, for example, preferably 80 to 100°, and more preferably 90°. Here, taking a plane that is one perpendicular to a surface, other than the projections 12, in the second surface 10*b* of the light diffusion sheet 10, that passes through the apex of the recess 13, and also that is a cross section of the light diffusion sheet, the cross section being produced by cutting a pair of inclined faces of the recess facing each other with the apex interposed therebetween such that cutting lines each perpendicularly meet the opening line of the recess, the apex angle θ of the recess 13 is an angle formed on that plane by the cutting lines of the inclined faces.

It is preferable that the plurality of recesses 13 are formed side by side on the first surface 10*a*, and specifically, substantially inverted polygonal pyramidal recesses are two-dimensionally arranged. The arrangement of the recesses formed on the first surface 10a is not particularly limited as long as light can be diffused by the recesses, and it is preferable that recesses each having such a shape that the recesses can be two-dimensionally arranged with no gap or with a little gap as described above are used as the recesses mentioned above, and the recesses are two-dimensionally arranged with no gap or with a little gap. More specifically, it is more preferable that substantially inverted quadrangular pyramidal recesses are two-dimensionally arranged with no gap or with a little gap as illustrated in FIG. 2. In the first surface 10a, the plurality of recesses 13 may be regularly arranged to such an extent that light can be diffused by the plurality of recesses 13, or alternatively the plurality of recesses 13 may be arranged at prescribed intervals. The distance (pitch) P between adjacent recesses 13 is not particularly limited as long as light can be diffused, and may be, for example, about 100 μm. Here, the pitch P is a horizontal distance (a distance taken along a direction parallel to the second surface 10b) between vertices in the respective adjacent recesses 13.

In an example, the first surface 10a is provided with a rugged shape in which substantially inverted quadrangular pyramidal recesses are two-dimensionally arranged as illustrated in FIG. 2. The recess 13 may be a recess having another substantially inverted polygonal pyramidal shape, or may be a recess having a shape other than substantially inverted polygonal pyramidal shapes as long as light can be diffused. In addition, the arrangement of the plurality of recesses 13 is not particularly limited as long as light can be diffused, and the recesses 13 may be randomly arranged to such an extent that light can be diffused.

The substantially inverted polygonal pyramidal shape includes an inverted polygonal pyramid shape (true inverted polygonal pyramidal shape) and a shape that can be substantially regarded as an inverted polygonal pyramidal shape. The substantially inverted quadrangular pyramidal shape includes an inverted quadrangular pyramid shape (true inverted quadrangular pyramidal shape) and a shape that can be substantially regarded as an inverted quadrangular pyramidal shape. In addition, here, "substantially" means that it can be approximated, and for example, the substantially inverted polygonal pyramidal shape is a shape that can be approximated to an inverted polygonal pyramid, and the substantially inverted quadrangular pyramidal shape is a shape that can be approximated to an inverted quadrangular pyramid. More specifically, the substantially inverted polygonal pyramidal shape includes an inverted truncated polygonal pyramidal shape as long as the area of the top portion is small enough to diffuse light. More specifically, the substantially inverted quadrangular pyramidal shape includes an inverted truncated quadrangular pyramidal shape as long as the area of the top portion is small enough to diffuse light. In addition, the substantially inverted polygonal pyramidal shape and the substantially inverted quadrangular pyramidal shape also include shapes deformed within a range of unavoidable shape variation caused by processing accuracy in industrial production when a recess is formed.

On the second surface 10b, a plurality of projections 12 that can transmit light are provided apart from each other. The plurality of projections 12 are preferably a plurality of projections being apart from each other in the form of islands. As described above, when the plurality of projections 12 are provided on the second surface 10b of the light diffusion sheet 10, the projections 12 are suitably separated from each other, and an air layer can be suitably formed between the light diffusion sheet 10 and another sheet adjacent thereto by the plurality of separated projections 12. In addition, the shape of the projection 12 is not particularly limited, and examples thereof include a hemispherical shape, a truncated cone shape, a truncated polygonal pyramidal shape, a cylindrical shape, and a polygonal columnar shape, and the shape is preferably a hemispherical shape. When the shape of the projection 12 is a hemispherical shape, an air layer can be suitably formed between the light diffusion sheet 10 and another sheet adjacent thereto regardless of the surface shape or the like of the other sheet adjacent to the light diffusion sheet 10. For example, when the other sheet is the light diffusion sheet 10 (that is, when the light diffusion sheets 10 are laminated and used), an air layer can be suitably formed between the light diffusion sheet 10 and the other sheet adjacent thereto even if the surface of the other sheet (the other light diffusion sheet 10) with which the projections 12 are in contact is provided with a plurality of recesses 13 formed as in the first surface 10a. Therefore, by providing such a plurality of projections 12 on the second surface 10b, the light diffusion sheet 10 can further enhance the diffusibility of light transmitted through the light diffusion sheet 10, can further inhibit a decrease in the luminance of transmitted light, and can further enhance in-plane uniformity of the luminance.

Of the second surface 10b, the surface other than the projections 12 is not particularly limited, but is preferably a flat surface, and more preferably a flat surface having an arithmetic mean roughness of 0.1 μm or less. When a region of the second surface 10b other than the projections 12 is a flat surface, light is easily made to enter through the second surface 10b, and light is easily emitted through the second surface 10b. As a result, it is possible to obtain a light diffusion sheet capable of sufficiently inhibiting a decrease in the luminance of transmitted light and enhancing in-plane uniformity of the luminance. The light diffusion sheet 10 preferably has a lower internal haze, and for example, the internal haze is preferably 1.5% or less. When the internal haze is low as described above, the light having entered through the second surface 10b can suitably reach the first surface 10a, and the light having entered through the first surface 10a can suitably reach the second surface 10b. As a result, it is possible to obtain a light diffusion sheet capable of sufficiently inhibiting a decrease in the luminance of transmitted light and enhancing in-plane uniformity of the luminance. The internal haze is a haze determined by excluding the surface haze from the total haze, where the surface haze is caused by the surface shape (specifically, the arithmetic mean roughness of the plurality of recesses 13 formed on the first surface 10a, the plurality of projections 12 provided on the second surface 10b, and a surface other than the projections 12 in the second surface 10b, and the like). The arithmetic mean roughness is a general arithmetic mean roughness, and examples thereof include an arithmetic mean roughness measured by a method in accordance with JIS B 0601 (1994).

The area occupied by the projections 12 is not particularly limited, but is preferably an area with which an air layer can be suitably formed between the light diffusion sheet 10 and another sheet adjacent thereto. The area occupied by the projections 12 is, for example, preferably 0.1 to 30%, and more preferably 0.3 to 20% with respect to the entire second surface 10b. The average height of the projections 12 is not particularly limited, but is preferably a height with which an air layer can be suitably formed between the light diffusion sheet 10 and another sheet adjacent thereto. The average height of the projections 12 is, for example, preferably 1 to 1000 μm, and more preferably 5 to 200 μm. With such projections, an air layer can be suitably formed between the light diffusion sheet 10 and another sheet adjacent thereto, a decrease in the luminance of transmitted light can be sufficiently inhibited, and in-plane uniformity of the luminance can be enhanced. The average height of the projections 12 is an arithmetic mean value of the heights of the projections 12 (a value obtained by dividing the total value of the heights of the projections 12 by the number of the projections 12). When the projections 12 have substantially the same size, the height of each of the projections 12 is the average height of the projections 12.

The material of the light diffusion sheet 10 is not particularly limited as long as the light diffusion shect can diffuse the light transmitted (for example, light can enter through the second surface 10b and can reach the first surface 10a, and the light having reached can be diffused; or light that enters through the first surface 10a can be diffused, the diffused light can reach the second surface 10b, and the uniformly diffused light is emitted through the second surface 10b), and examples thereof include a resin having translucency (translucent resin). The material thereof is not particularly limited, and examples thereof include a resin having translucency (translucent resin). Examples of the translucent resin include an acrylic resin, polystyrene, polycarbonate, a methyl methacrylate-styrene copolymer, polyethylene terephthalate, polyethylene naphthalate, cellulose acetate, polyimide, and an ultraviolet (UV) curable resin. Examples of the UV curable resin include a UV curable acrylic resin. In the case of a sheet including the body portion 11 and the plurality of projections 12 as illustrated in FIGS. 1 and 2, as the translucent resin constituting the light diffusion sheet 10, for example, polycarbonate or the like is used as the resin constituting the body portion 11, and a UV curable resin such as a UV curable acrylic resin is used as the resin constituting the plurality of projections 12. In the case of such a sheet, the projections 12 can be formed by appropriately dropping an uncured UV curable resin to the body portion 11 made of polycarbonate or the like on the surface thereof on the side opposite from the side where the plurality of recesses 13 are formed, and then curing the UV curable resin. Accordingly, a sheet having the plurality of projections 12 can be easily manufactured.

The light diffusion sheet 10 may or may not contain a light diffusing agent. The light diffusion sheet 10 can suitably diffuse light even if containing no light diffusing agent. Therefore, from this viewpoint, the light diffusion sheet 10 preferably contains no light diffusing agent. In order to further enhance the light diffusibility in the light diffusion sheet 10, the light diffusion sheet 10 preferably contains a light diffusing agent.

Figure 3:
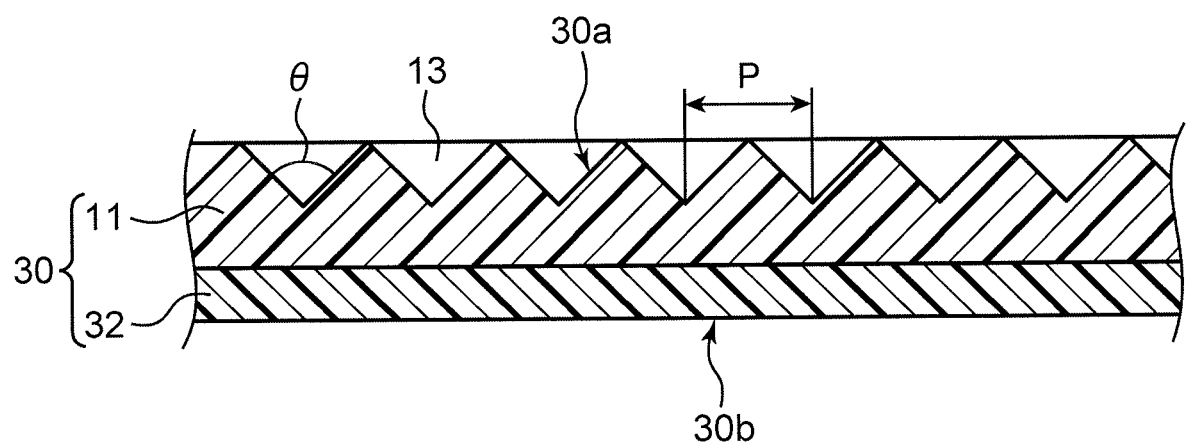
FIG. 3 is a schematic sectional view illustrating a light diffusion sheet according to a Comparative Example.

The light diffusion sheet 10 according to the present embodiment can suitably diffuse the transmitted light with the configuration described above. In the case of making light enter the light diffusion sheet 10 through the second surface 10b, the light having entered through the second surface 10b reaches the first surface 10a and can be suitably diffused at the first surface 10a. In the case of making light enter the light diffusion sheet 10 through the first surface 10a, the light that enters through the first surface 10a is uniformly diffused and the diffused light reaches the second surface 10b, and the uniformly diffused light is emitted through the second surface 10b. Therefore, the light diffusion sheet 10 can sufficiently inhibit a decrease in the luminance of transmitted light, and can enhance in-plane uniformity of the luminance. Specifically, the light diffusion sheet 10 can sufficiently inhibit a decrease in the luminance of transmitted light and can enhance in-plane uniformity of the luminance as compared with the light diffusion sheet as illustrated in FIG. 3 (a light diffusion sheet in which a resin layer 32 that covers the second surface side of the light diffusion sheet 10 is provided instead of the projections 12). The light diffusion sheet 30 has a first surface 30a on which a plurality of recesses 13 for diffusing light are formed, and a flat second surface 30b through which light can be transmitted. The light diffusion sheet 30 includes a body portion 11 having the first surface 30a. The body portion 11 of the light diffusion sheet 30 is the same as the body portion 11 of the light diffusion sheet 10, and the light diffusion sheet 30 has, on the body portion 11, a resin layer 32 that covers the body portion. That is, FIG. 3 is a schematic sectional view illustrating the light diffusion sheet 30 according to Comparative Example.

The method for manufacturing the light diffusion sheet 10 is not particularly limited as long as the light diffusion sheet 10 having the configuration described above can be manufactured. As a method of manufacturing the light diffusion sheet 10, first, the body portion 11 is manufactured. Examples of a method of manufacturing the body portion 11 include extrusion forming (extrusion molding, injection molding, or the like using a mold with which the plurality of recesses 13 are to be formed on one surface of the body portion), and a method of deforming a resin layer both the surfaces of which are flat by pressing a mold with which the plurality of recesses 13 are to be formed on one surface of the resin layer. Next, on the body portion 11 obtained in this manner, the plurality of projections 12 are formed. The method for forming the plurality of projections 12 may be a method in which the material of the projections 12 (an uncured UV curable resin or the like) is appropriately dropped onto the body portion 11 and then the dropped material of the projections 12 is subjected to treatment (curing treatment or the like) to form the projections. Another method for forming the plurality of projections 12 may be a method of forming the plurality of projections 12 by printing such as screen printing. The screen printing may be screen printing using a structural material capable of forming the projections 12 and a screen printing plate. Examples of the screen printing plate include a screen printing plate made of a stainless steel mesh with an emulsion applied. Examples of the stainless steel mesh include screen mesh #80 made of stainless steel. The thickness of the emulsion is, for example, about 400 μm. Examples of the structural material include an ink containing a UV curable resin, and more specifically include RL-D CLEAR for braille points (UV ink) manufactured by Jujo Chemical Co., Ltd. When such an ink containing a UV curable resin is used, curing treatment such as ultraviolet irradiation is performed after screen printing. By such screen printing, the plurality of projections 12 (for example, hemispherical projections having a height of about 400 μm) can be formed on the body portion 11.

[Laminate of Light Diffusion Sheet]

Figure 4:
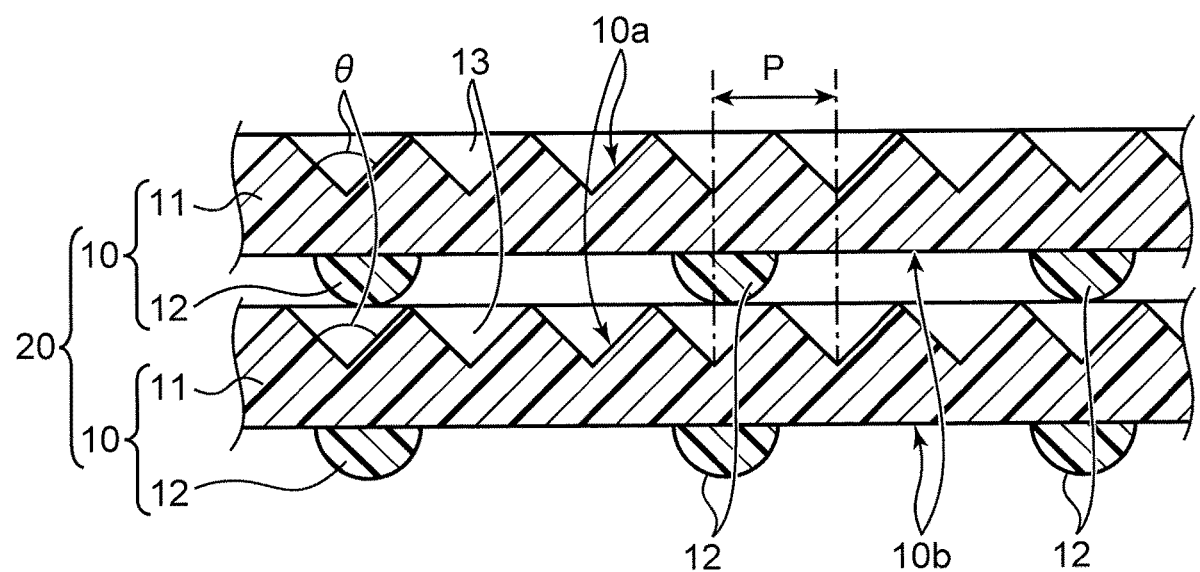
FIG. 4 is a schematic sectional view illustrating a light diffusion sheet laminate in which the light diffusion sheet according to the embodiment of the present invention is laminated.

As to the light diffusion sheet, a plurality of sheets thereof may be laminated in advance before being incorporated into a backlight unit. That is, a light diffusion sheet laminate including a plurality of the light diffusion sheets in layers may be used. Examples of the light diffusion sheet laminate 20 include a laminate in which a plurality of the light diffusion sheets 10 are laminated in a state in which the first surfaces 10a face the same direction (in other words, the second surfaces 10b face the same direction.) as illustrated in FIG. 4. FIG. 4 is a schematic sectional view illustrating a light diffusion sheet laminate 20 in which a plurality of the light diffusion sheets 10 according to the present embodiment are laminated. The light diffusion sheet laminate may be one in which a plurality of the light diffusion sheets described above in a state where the first surfaces 10a face in opposite directions. In the laminate of the light diffusion sheet described above, the number of the light diffusion sheet laminated is not limited to two as illustrated in FIG. 4. The number of the sheet laminated is not particularly limited, but is preferably 2 to 5, and more preferably 2 or 3. By laminating a plurality of the light diffusion sheets, such a light diffusion sheet laminate can further enhance in-plane uniformity of luminance. Since the light diffusion sheet can inhibit a decrease in the luminance of transmitted light, it is possible to inhibit a significant decrease in the luminance of transmitted light also when a plurality of the light diffusion sheets are laminated. Therefore, the decrease in the luminance of transmitted light can be sufficiently inhibited, and in-plane uniformity of the luminance can be further enhanced. Even when a backlight unit including a plurality of the light diffusion sheets is assembled, a light diffusion sheet laminate in which the light diffusion sheets are laminated in advance is easy to handle and workability for assembling the backlight unit is improved because the light diffusion sheet laminate is thicker than a single sheet of the light diffusion sheet. In addition, in the case of the light diffusion sheet laminate in which the light diffusion sheets are laminated in advance, it is possible to inhibit the occurrence of scratches on the light diffusion sheets due to rubbing between the light diffusion sheets at the time of assembling the backlight unit. Further, it is also possible to inhibit the occurrence of contamination of foreign matters such as dirt and dust between the light diffusion sheets constituting the light diffusion sheet laminate. Furthermore, when a backlight unit is assembled, it is possible to prevent a wrong combination of the light diffusion sheets (the occurrence of human error).

[Backlight Unit]

Figure 5:
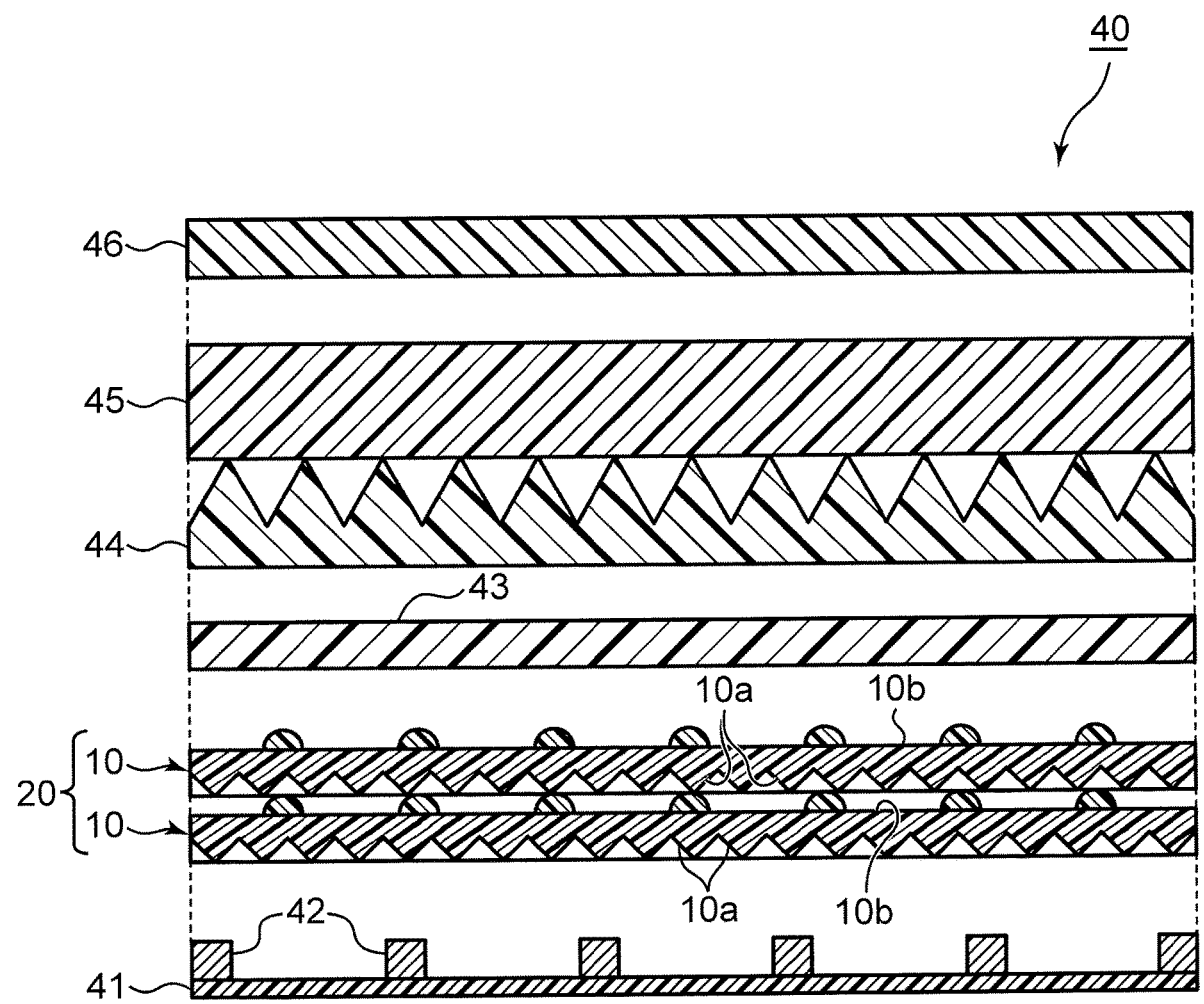
FIG. 5 is a schematic sectional view illustrating one example of a configuration of a backlight unit including the light diffusion sheet according to the embodiment of the present invention.

The backlight unit included in the liquid crystal display device is not particularly limited as long as the backlight unit includes the light diffusion sheet 10. Examples of the backlight unit include a backlight unit comprising a plurality of light sources and the light diffusion sheet, wherein the light diffusion sheet is disposed with the second surface facing toward the plurality of light sources. With such a backlight unit, light beams emitted from the plurality of light sources included in the backlight unit are made to enter through the second surface of the light diffusion sheet and can be transmitted through the light diffusion sheet. Examples of the backlight unit also include a backlight unit comprising a plurality of light sources and the light diffusion sheet described above, wherein the light diffusion sheet is disposed with the first surface facing toward the plurality of light sources as illustrated in FIG. 5. With such a backlight unit, light beams emitted from the plurality of light sources included in the backlight unit are made to enter through the first surface of the light diffusion sheet and can be transmitted through the light diffusion sheet. When light is transmitted through the light diffusion sheet from whichever surface, the first surface or the second surface, the light can be suitably diffused, and in-plane uniformity of luminance can be enhanced as described above. With the light diffusion sheet described above, even if light emitted from the light source is transmitted through the light diffusion sheet, it is possible to inhibit a decrease in luminance. Therefore, the backlight unit can emit light having superior luminance and high in-plane uniformity of luminance. In addition, the light diffusion sheet can ensure sufficient in-plane uniformity even when the light diffusion sheet is thinned and the distance from a light source is shortened. Therefore, the backlight unit can be thinned by including the light diffusion sheet, and as a result, a liquid crystal display device can be thinned.

The backlight unit is not particularly limited with respect to the method thereof, and for example, the backlight unit may be a direct method backlight unit or an edge-light method backlight unit, but is preferably a backlight unit in which a plurality of light sources are included and the plurality of light sources are disposed apart from each other. Such a backlight unit is specifically a backlight unit which further comprises a reflection sheet that reflects light emitted from the plurality of light sources, wherein the plurality of light sources are arranged apart from each other on a surface of the reflection sheet on a side where the light diffusion sheet is located. Such a so-called direct method backlight unit is preferable. Since the light diffusion sheet described above can enhance the in-plane uniformity of the luminance of transmitted light even in such a backlight unit, it is possible to obtain a backlight unit that emits light having superior luminance and higher in-plane uniformity of luminance. Examples of the backlight unit include a direct method backlight unit 40 as illustrated in FIG. 5. Further, the light diffusion sheet provided in the backlight unit can ensure sufficient in-plane uniformity of luminance even if the number of light sources (the number of light sources per unit area) is reduced, and therefore, it is also possible to reduce the number of light sources in the backlight unit.

The backlight unit is just required to include the light diffusion sheet described above, and the number of the light diffusion sheet may be one or may be multiple. Owing to the inclusion of a plurality of the light diffusion sheets, in-plane uniformity of the luminance of light emitted from the backlight unit tends to be enhanced. In a case where a plurality of the light diffusion sheets are included, surfaces of the plurality of light diffusion sheets, the surfaces being arranged facing toward the plurality of light sources, are the same type of surface. That is, the plurality of light diffusion sheets are each disposed each with the first surface facing toward the plurality of light sources, or alternatively with the second surface facing toward the plurality of light sources. Each of the light diffusion sheet may be disposed with the first surface facing toward the plurality of light sources or with the second surface facing toward the plurality of light sources. For example, which of the first surface and the second surface is preferable as the surface to be arranged facing toward the plurality of light sources varies depending on the light sources or the like, and for example, in a case where light emitting diode elements that emit blue light are used as the light sources, the light diffusion sheet is preferably disposed with the first surface facing toward the plurality of light sources. Preferably, the backlight unit, includes a plurality of the light diffusion sheets described above in layers, and each of the plurality of light diffusion sheets is disposed with the first surface facing toward the plurality of light sources. On the other hand, when the number of the light diffusion sheets laminated is excessively large, the luminance of light transmitted through the plurality of light diffusion sheets tends to decrease, and thus the luminance of light emitted from the backlight unit tends to decrease. For these reasons, the number of the light diffusion sheets laminated in the backlight unit is not particularly limited, but is preferably 2 to 5, and more preferably 2 or 3.

The backlight unit 40 includes a reflection sheet 41, a plurality of light sources 42, the light diffusion sheet 10 described above, a color conversion sheet 43, a first prism sheet 44, a second prism sheet 45, and a polarizing sheet 46 as illustrated in FIG. 5. The plurality of light sources 42 are two-dimensionally disposed on the reflection sheet 41. The light diffusion sheet 10 is the light diffusion sheet according to the present embodiment, and as described above, a single sheet thereof may be used, or alternatively a plurality of sheets thereof may be laminated. In FIG. 5 is illustrated a case where two sheets of the light diffusion sheet 10 are laminated. The light diffusion sheets 10 are located between the light sources 42 and the first prism sheet. In the backlight unit 40, the color conversion sheet 43 is disposed between the first prism sheet 44 and the light diffusion sheets 10 as illustrated in FIG. 5, but the color conversion sheet may be disposed between the light sources 42 and the light diffusion sheets 10, or the color conversion sheet 43 may not be disposed. The first prism sheet 44 and the second prism sheet 45 are located between the light diffusion sheets 10 and the polarizing sheet 46, and the first prism sheet 44 is disposed closer to the light diffusion sheet 10 and the second prism sheet 45 is disposed closer to the polarizing sheet 46. FIG. 5 is a schematic sectional view illustrating one example of a configuration of a backlight unit 40 including the light diffusion sheet 10 according to the present embodiment.

The reflection sheet 41 is not particularly limited, and may be, for example, a reflection sheet to be provided in a common backlight unit. Examples of the reflection sheet 41 include a white polyethylene terephthalate resin film and a silver-deposited film.

The light source 42 is not particularly limited, and examples thereof include a light source to be provided in a common backlight unit. As the light source 42, a so-called small light source can be used, and examples thereof include a light emitting diode (LED) element and a laser element. Among them, an LED element is preferably used from the viewpoint of cost, productivity, and so on. In addition, even when the light emitted from the light source 42 is blue light, the light diffusion sheet 10 can suitably diffuse the light and can enhance in-plane uniformity of luminance. Therefore, the light source 42 may be a light emitting diode element that emits blue light. In addition, when the backlight unit 40 includes, for example, a color conversion sheet 43 or the like capable of converting blue light into white light together with the light diffusion sheet 10, it is possible to provide a backlight unit that emits light having superior luminance and high in-plane uniformity of luminance. Therefore, the light source 42 may be a blue LED element that emits blue light. In addition, the light source 42 may have a rectangular shape in plan view, and in this case, the length of one side is preferably 10 μm to 20 mm, more preferably 10 μm to 10 mm, and still more preferably 50 μm to 5 mm. When an LED element is used as the light source 42, LED chips may be disposed on the reflection sheet 41 at regular intervals. In addition, a lens may be attached to the LED in order to adjust a light emission angle characteristic of the LED element serving as the light source 42.

The color conversion sheet 43 is a sheet that transmits light to convert the color of the light into a prescribed color (for example, white light). For example, in a case where a light emitting diode element that emits blue light is used as the light source 42, the color conversion sheet 43 may be a color conversion sheet that converts blue light into white. Examples of the color conversion sheet 43 include a sheet containing a binder and a fluorescent agent.

The fluorescent agent is not particularly limited, and may be, for example, a fluorescent agent capable of absorbing light and emitting the absorbed light with a longer wavelength. Examples of the fluorescent agent include a yellow fluorescent agent that is excited by blue light to emit yellow light (a yellow fluorescent agent capable of absorbing blue light to emit light converted to a yellow side as compared with the blue light), a green fluorescent agent that is excited by blue light to emit green light (a green fluorescent agent capable of absorbing blue light to emit light converted to a green side as compared with the blue light), and a red fluorescent agent that is excited by blue light to emit red light (a red fluorescent agent capable of absorbing blue light to emit light converted to a red side as compared with the blue light). Examples of the yellow fluorescent agent include YAG and LSN. Examples of the green fluorescent agent include β-SiAlON and LuAG. Examples of the red fluorescent agent include KSF and CASN. The fluorescent agent preferably includes the green fluorescent agent and the red fluorescent agent, and may be one composed of the green fluorescent agent and the red fluorescent agent. In such a case, for example, where the light to be transmitted through the color conversion sheet is blue light, the blue light is absorbed by the green fluorescent agent, and light converted to a green side as compared with the blue light can be emitted. In addition, the blue light to be transmitted through the color conversion sheet is absorbed by the red fluorescent agent contained in the color conversion sheet, and light converted to a red side as compared with the blue light can be emitted. The mixed color light composed of the converted lights is to be converted to a yellow side. Then, the light transmitted through the color conversion sheet is to be converted to a white light side by the mixed color light.

Examples of the binder include a resin having translucency (translucent resin). Examples of the translucent resin include those the same as the translucent resin constituting the light diffusion sheet 10.

Examples of the color conversion sheet include the sheet as described above, and more specifically include a quantum dot sheet (QD sheet).

The first prism sheet 44 and the second prism sheet 45 are not particularly limited, and examples thereof include a prism sheet to be provided in a common backlight unit. Examples of the first prism sheet 44 and the second prism sheet 45 include a film having thereon a plurality of grooves each having an isosceles triangular transversal cross-section and provided in an adjacent manner, wherein the vertex angle of a prism defined by a pair of grooves adjacent to each other is approximately 90°. More specifically, the first prism sheet 44 and the second prism sheet 45 each may be a polyethylene terephthalate (PET) film provided with a prism shape using a UV curable acrylic resin. The first prism sheet 44 and the second prism sheet 45 are disposed such that the grooves formed in the first prism sheet 44 and the grooves formed in the second prism sheet 45 are orthogonal to each other. The first prism sheet 44 and the second prism sheet 45 may be integrally formed.

The polarizing sheet 46 is not particularly limited, and may be, for example, a polarizing sheet to be provided in a common backlight unit. As the polarizing sheet 46, a commercially available product may be used, and examples thereof include the DBEF series manufactured by 3M Company.

[Liquid Crystal Display Device]

Figure 6:
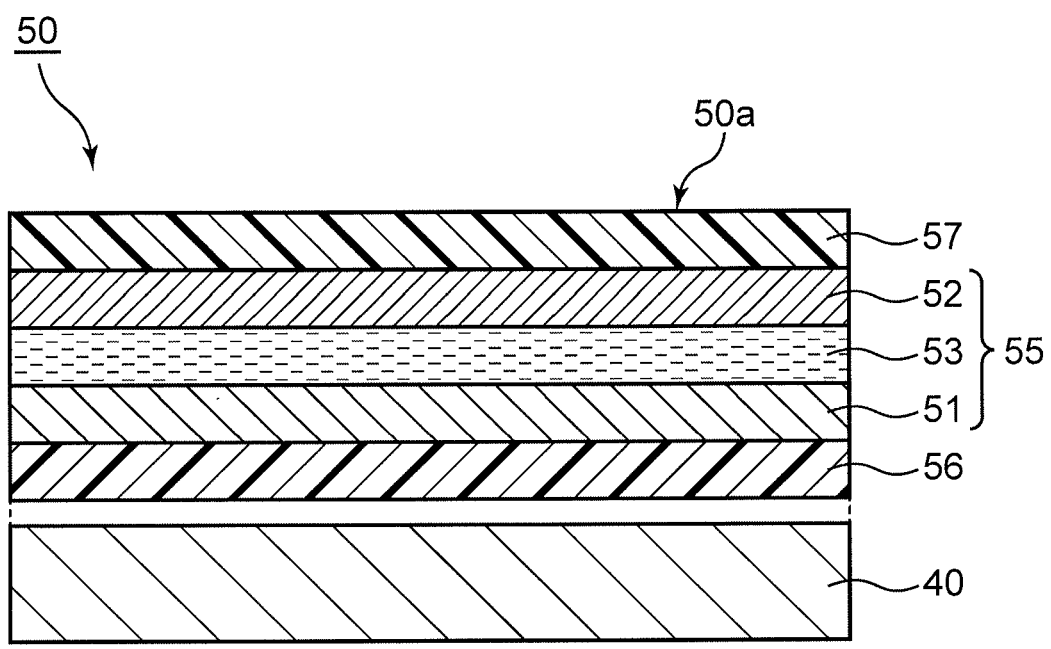
FIG. 6 is a schematic sectional view illustrating one example of a configuration of a liquid crystal display device including the backlight unit illustrated in FIG. 5.

The liquid crystal display device is not particularly limited as long as it includes the backlight unit described above (that is, a backlight unit including a plurality of light sources and the light diffusion sheet described above), and specifically is a liquid crystal display device including the backlight unit and a liquid crystal panel. Examples of the liquid crystal display device include a liquid crystal display device including a liquid crystal panel disposed closer to the prism sheet with respect to the backlight unit described above, and more specifically include a liquid crystal display device 50 as illustrated in FIG. 6. In such a liquid crystal display device, light having superior luminance and high in-plane uniformity of luminance is emitted from the backlight unit including the light diffusion sheet described above, so that an image can be suitably displayed on the liquid crystal panel. The liquid crystal display device 50 includes the backlight unit 40 described above, a liquid crystal panel 55, a first polarizing plate 56, and a second polarizing plate 57 as illustrated in FIG. 6. The liquid crystal panel 55 is located between the first polarizing plate 56 and the second polarizing plate 57, the first polarizing plate 56 is disposed closer to the backlight unit 40, and the second polarizing plate 57 is disposed on the side farther from the backlight unit 40 (the side closer to the display screen 50a of the liquid crystal display device 50). FIG. 6 is a schematic sectional view illustrating one example of the configuration of the liquid crystal display device 50 including the backlight unit 40.

The liquid crystal panel 55 includes a thin film transistor (TFT) substrate 51 and a color filter (CF) substrate 52 disposed to face each other, and a liquid crystal layer 53 disposed between the TFT substrate 51 and the CF substrate 52. The liquid crystal panel 55 further includes a sealing member (not shown) provided in a frame shape in order to enclose the liquid crystal layer 53 between the TFT substrate 51 and the CF substrate 52.

The TFT substrate 51 is not particularly limited, and may be, for example, a TFT substrate to be provided in a common liquid crystal display device. Examples of the TFT substrate 51 include a substrate including a glass substrate, a plurality of TFTs provided in a matrix on the glass substrate, an interlayer insulating film provided to cover the respective TFTs, a plurality of pixel electrodes provided in a matrix on the interlayer insulating film and connected to the TFTs, respectively, and an alignment film provided to cover the respective pixel electrodes.

The CF substrate 52 is not particularly limited, and may be, for example, a CF substrate to be provided in a common liquid crystal display device. Examples of the CF substrate 52 include a substrate including a glass substrate, a black matrix provided in a lattice shape on the glass substrate, a color filter including a red layer, a green layer, and a blue layer provided in each cell of the lattice of the black matrix, a common electrode provided to cover the black matrix and the color filter, and an alignment film provided to cover the common electrode.

The liquid crystal layer 53 is not particularly limited, and may be, for example, a liquid crystal layer to be provided in a common liquid crystal display device. Examples of the liquid crystal layer 53 include a liquid crystal layer formed of, for example, a nematic liquid crystal material containing liquid crystal molecules having electro-optical characteristics.

The first polarizing plate 56 and the second polarizing plate 57 are not particularly limited, and each may be, for example, a polarizing plate to be provided in a common liquid crystal display device. The first polarizing plate 56 and the second polarizing plate 57 each may be, for example, a polarizing plate including a polarizer layer having a unidirectional polarization axis and a pair of protective layers provided to sandwich the polarizer layer.

The shape of the display screen 50a of the liquid crystal display device 50 viewed from the front (upper side in FIG. 6) is not particularly limited. This shape is often a rectangle or a square, but is not limited thereto, and may be any shape such as a rectangle with rounded corners, an oval, a circle, a trapezoid, or the shape of an instrument panel of an automobile.

In the liquid crystal display device 50, in sub-pixels corresponding to the respective pixel electrodes, a prescribed voltage is applied to the liquid crystal layer 53 to change the alignment state of the liquid crystal layer 53, while the light emitted from the backlight unit 40 and allowed to enter through the first polarizing plate 56 is emitted through the second polarizing plate 57 with an adjusted transmittance. Thereby, an image is displayed.

The liquid crystal display device 50 is used as a display device to be built in various information devices (e.g., an in-vehicle device such as a car navigation system, a personal computer, a mobile phone, a portable information terminal, a portable game machine, a copying machine, a ticket vending machine, and an automated-teller machine).

Although the present description discloses the techniques of various aspects as described above, the main technology among them is summarized below.

One aspect of the present invention is a light diffusion sheet having a first surface on which a plurality of recesses that diffuse light are formed, and a second surface on which a plurality of projections that can transmit light are provided apart from each other.

With such a configuration, it is possible to provide a light diffusion sheet capable of sufficiently inhibiting a decrease in the luminance of transmitted light and enhancing in-plane uniformity of the luminance. The reason for this is considered to be as follows.

First of all, owing to the fact that the light diffusion sheet has a plurality of projections provided apart from each other on the second surface, even if another sheet is disposed adjacent to the light diffusion sheet on the second surface, the light diffusion sheet and the other sheet are apart from each other. That is, an air layer can be suitably formed between the light diffusion sheet and the other sheet. In addition, even though the second surface has the projections, it is possible to make light both enter and exit through the second surface because the projections can transmit light. In the case of making light enter through the second surface of the light diffusion sheet, the light having entered through the second surface reaches the first surface and can be uniformly diffused by the recesses formed in the first surface. In the case of making light enter through the first surface of the light diffusion sheet, the light that enters through the first surface is uniformly diffused by the recesses formed in the first surface, the diffused light reaches the second surface, and the uniformly diffused light is emitted through the second surface. In addition, it is considered that owing to the presence of the air layer formed between the light diffusion sheet and another sheet adjacent thereto, a distance from the light sources can be increased and light can be uniformly diffused. That is, it is considered that a decrease in in-plane uniformity of luminance due to a decrease in the distance from the light sources can be inhibited. In addition, since improvement of diffusion of light is not intended to be achieved by thickening the light diffusion sheet, it is considered that a decrease in luminance of transmitted light can be sufficiently inhibited. Therefore, it is expected that the light diffusion sheet can sufficiently inhibit a decrease in the luminance of transmitted light, and also can enhance in-plane uniformity of the luminance.

Therefore, by using the light diffusion sheet for a backlight unit, it is possible to provide a backlight unit having superior luminance and also high in-plane uniformity of luminance. In addition, since the light diffusion sheet can enhance in-plane uniformity of luminance, sufficient in-plane uniformity of luminance can be secured even when the light diffusion sheet is thinned or the distance of the light diffusion sheet from the light sources is shortened. Therefore, the backlight unit can be thinned, and as a result, a liquid crystal display device can be thinned. Further, since the light diffusion sheet can enhance in-plane uniformity of luminance, sufficient in-plane uniformity of luminance can be secured even when the number of light sources (the number of light sources per unit area) is reduced. Therefore, the number of light sources in the backlight unit can be reduced.

In the light diffusion sheet, the plurality of projections are preferably a plurality of projections being apart from each other in the form of islands.

With this configuration, a decrease in the luminance of transmitted light can be further inhibited, and also in-plane uniformity of the luminance can be further enhanced. This is considered to be because the air layer can be more suitably formed between the light diffusion sheet and another sheet adjacent thereto.

In the light diffusion sheet, each of the projections preferably has a hemispherical shape.

With this configuration, a decrease in the luminance of transmitted light can be further inhibited, and also in-plane uniformity of the luminance can be further enhanced. This is considered to be because the air layer can be more suitably formed between the light diffusion sheet and the other sheet adjacent thereto regardless of the surface shape or the like of the other sheet adjacent to the light diffusion sheet.

In the light diffusion sheet, an area occupied by the projections is preferably 0.1 to 30% with respect to the entire second surface.

With this configuration, a decrease in the luminance of transmitted light can be further inhibited, and also in-plane uniformity of the luminance can be further enhanced. This is considered to be because the air layer can be more suitably formed between the light diffusion sheet and another sheet adjacent thereto.

In the light diffusion sheet, an average height of the projections is preferably 1 to 1000 µm.

With this configuration, a decrease in the luminance of transmitted light can be further inhibited, and also in-plane uniformity of the luminance can be further enhanced. This is considered to be because the air layer can be more suitably formed between the light diffusion sheet and another sheet adjacent thereto.

In addition, in the light diffusion sheet, a surface other than the projections in the second surface is preferably a flat surface.

With this configuration, a decrease in the luminance of transmitted light can be further inhibited, and also in-plane uniformity of the luminance can be further enhanced.

In the light diffusion sheet, the recess preferably has a substantially inverted polygonal pyramidal shape, and more preferably has a substantially inverted quadrangular pyramidal shape.

With this configuration, a decrease in the luminance of transmitted light can be further inhibited, and also in-plane uniformity of the luminance can be further enhanced. This is considered to be because where the recesses formed in the first surface have the shape described above, when light is transmitted through the first surface, the light is more uniformly diffused. Specifically, that is considered to be because in the case of making light enter through the second surface of the light diffusion sheet, at the time when the light having entered through the second surface and reached the first surface is emitted through the first surface, the light is more uniformly diffused if the recesses formed in the first surface have the above-described shape. That is considered to be because in the case of making light enter through the first surface of the light diffusion sheet, the light that enters through the first surface is more uniformly diffused and the diffused light reaches the second surface, and the uniformly diffused light is emitted through the second surface.

Another aspect of the present invention is a light diffusion sheet laminate including a plurality of the light diffusion sheets described above.

With such a configuration, in-plane uniformity of luminance can be further enhanced by laminating a plurality of the light diffusion sheets. Since the light diffusion sheet can inhibit a decrease in the luminance of transmitted light, it is possible to inhibit a significant decrease in the luminance of transmitted light also when a plurality of the light diffusion sheets are laminated. Therefore, the decrease in the luminance of transmitted light can be sufficiently inhibited, and in-plane uniformity of the luminance can be further enhanced. Even when a backlight unit including a plurality of the light diffusion sheets is assembled, a light diffusion sheet laminate in which the light diffusion sheets are laminated in advance is easy to handle and workability for assembling the backlight unit is improved because the light diffusion sheet laminate is thicker than a single sheet of the light diffusion sheet. In addition, in the case of the light diffusion sheet laminate in which the light diffusion sheets are laminated in advance, it is possible to inhibit the occurrence of scratches on the light diffusion sheets due to rubbing between the light diffusion sheets at the time of assembling the backlight unit. Further, it is also possible to inhibit the occurrence of contamination of foreign matters such as dirt and dust between the light diffusion sheets constituting the light diffusion sheet laminate. Furthermore, when a backlight unit is assembled, it is possible to prevent a wrong combination of the light diffusion sheets (the occurrence of human error).

Another aspect of the present invention is a backlight unit including a plurality of light sources and the light diffusion sheet described above.

With such a configuration, since the light diffusion sheet is provided, light emitted from the light sources can be suitably diffused, and in-plane uniformity of luminance can be enhanced. In addition, even if the light emitted from the light sources is transmitted through the light diffusion sheet, it is possible to inhibit a decrease in the luminance of the light. Therefore, it is possible to provide a backlight unit that emits light having superior luminance and also high in-plane uniformity of luminance. In addition, the light diffusion sheet provided in the backlight unit can ensure sufficient in-plane uniformity even if the light diffusion sheet is thinned or the distance from the light sources is shortened, so that the backlight unit can be thinned, and as a result, a liquid crystal display device can be thinned. Further, the light diffusion sheet provided in the backlight unit can ensure sufficient in-plane uniformity of luminance even if the number of light sources (the number of light sources per unit area) is reduced, and therefore, it is also possible to reduce the number of light sources in the backlight unit.

In the backlight unit, the light diffusion sheet preferably includes a plurality of light diffusion sheets in layers, and surfaces of the light diffusion sheets arranged facing toward the plurality of light sources are same.

With such a configuration, in-plane uniformity of luminance can be further enhanced by laminating a plurality of the light diffusion sheets. Since the light diffusion sheet can inhibit a decrease in the luminance of transmitted light, it is possible to inhibit a significant decrease in the luminance of transmitted light also when a plurality of the light diffusion sheets are laminated. Therefore, it is possible to provide a backlight unit that emits light having superior luminance and also further enhanced in-plane uniformity of luminance.

In the backlight unit, the light diffusion sheet is preferably arranged with the first surface facing toward the plurality of light sources.

With such a configuration, a backlight unit having higher luminance and higher in-plane uniformity of luminance can be obtained. For example, when a light emitting diode element that emits blue light is used as the light source, a backlight unit having higher luminance and in-plane uniformity of the luminance can be obtained.

In the backlight unit, the plurality of light sources are preferably arranged apart from each other.

Such a backlight unit in which the plurality of light sources are disposed apart from each other can be a backlight unit that emits light having superior luminance and also high in-plane uniformity of luminance even if the backlight unit is, for example, a direct method backlight unit.

Preferably, the backlight unit described above further comprises a reflection sheet that reflects light emitted from the plurality of light sources, and the plurality of light sources are arranged apart from each other on a surface of the reflection sheet on a side where the light diffusion sheet is located.

The backlight unit having such a configuration is a so-called direct method backlight unit, and such a backlight unit also can be a backlight unit that emits light having superior luminance and also high in-plane uniformity of luminance.

In the backlight unit, each of the light sources may be a light emitting diode element that emits blue light.

Even when the light emitted from the light source is blue light, the light diffusion sheet can suitably diffuse the light and can enhance in-plane uniformity of luminance. Therefore, the light source may be a light emitting diode element that emits blue light. In addition, when the backlight unit includes, for example, a color conversion sheet capable of converting blue light into white light together with the light diffusion sheet, it is possible to provide a backlight unit that emits light having superior luminance and high in-plane uniformity of luminance.

Another aspect of the present invention is a liquid crystal display device comprising a backlight unit comprising a plurality of light sources and the light diffusion sheet described above, and a liquid crystal panel. That is, the liquid crystal display device is one including the backlight unit described above and a liquid crystal panel.

With such a configuration, since the liquid crystal display device includes the backlight unit that emits light having superior luminance and also high in-plane uniformity of luminance, the liquid crystal display device having superior image quality can be provided. In addition, since the backlight unit included in the liquid crystal display device can be thinned, the liquid crystal display device can be thinned.

The present invention can provide a light diffusion sheet capable of sufficiently inhibiting a decrease in the luminance of transmitted light and also enhancing in-plane uniformity of the luminance. In addition, the present invention provides a light diffusion sheet laminate in which the light diffusion sheet is laminated, a backlight unit including the light diffusion sheet, and a liquid crystal display device including the backlight unit.

Hereinafter, the present invention will be described more specifically with reference to Examples, but the scope of the present invention is not limited thereto.

EXAMPLES

Example 1

A pyramid sheet [a sheet in which one surface is a surface formed such that substantially inverted quadrangular pyramidal (inverted pyramidal) recesses are two-dimensionally arranged with no gap, and the other surface is a flat surface having an arithmetic mean roughness of 0.03 µm] made of polycarbonate and having a thickness of 110 µm was prepared. The arithmetic mean roughness referred to herein was measured using SJ-210 manufactured by Mitutoyo Corporation at a measurement speed of 0.5 mm/sec, a measurement distance of 4 mm, and a cut-off value $\lambda c$ of 0.8 mm in accordance with JIS B 0601 (1994). Specifically, the pyramid sheet was manufactured as follows. First, a pelletized resin (polycarbonate, Iupilon, manufactured by Mitsubishi Engineering-Plastics Corporation) was formed into a resin film by an extrusion forming machine. The resin film obtained was sandwiched between two metal rolls, namely, a roll having a surface with a projecting pyramidal shape [a shape corresponding to a substantially inverted quadrangular pyramidal shape (inverted pyramidal shape)] and a flat roll (mirror surface roll), affording the pyramidal sheet.

Next, an uncured (liquid) UV curable resin (UV curable acrylic resin, a resin having a refractive index of 1.55, manufactured by Kyoeisha Chemical Co., Ltd.) was dropped on a flat surface of the pyramid sheet such that the shape after curing would be hemispherical projections having a radius of 50 µm and the area ratio of the projections (the ratio of the area occupied by the projections to the entire flat surface: dot area ratio) would be 0.39%. Thereafter, the uncured (liquid) UV curable resin dropped on the pyramid sheet was irradiated with UV, whereby the UV curable resin was cured. As a result, hemispherical projections having a radius of 50 µm were formed on the flat surface of the pyramid sheet such that the area ratio of the projections was 0.39%, and a light diffusion sheet according to Example 1 was obtained. Since the projections had substantially the same height, the average height of the projections was 50 µm. In addition, the thickness of the light diffusion sheet was 160 µm in total including the height of the projections.

Examples 2 to 6

The light diffusion sheets according to Examples 2 to 6 were manufactured in the same manner as the light diffusion sheet according to Example 1 except that the projections were formed such that the area ratios (dot area ratios) of the projections were 0.79%, 1.6%, 3.9%, 7.9%, and 16%, respectively. The projections were hemispherical projections having a radius of 50 µm, similarly to the light diffusion sheet according to Example 1. The thickness of each of the light diffusion sheets was 160 µm, similarly to the light diffusion sheet according to Example 1.

COMPARATIVE EXAMPLE

The uncured (liquid) UV curable resin (UV curable acrylic resin) described above was applied to the flat surface of the pyramid sheet such that a layer having a thickness of 50 µm would be formed after curing. Thereafter, the uncured (liquid) UV curable resin applied to the pyramid sheet was irradiated with UV, whereby the UV curable resin was cured. As a result, a layer having a thickness of 50 μm was formed on the flat surface of the pyramid sheet, and a light diffusion sheet according to Comparative Example was obtained. The thickness of the light diffusion sheet was 160 μm.

[Evaluation (Luminance and In-Plane Uniformity of Luminance)]

Evaluation (luminance and in-plane uniformity of luminance) of each of the light diffusion sheets according to Examples 1 to 6 and Comparative Example was performed as follows.

First, using the light diffusion sheets according to Examples 1 to 6 and Comparative Example as a light diffusion sheet, backlight units having a configuration similar to that of the backlight unit illustrated in FIG. 5 were assembled except that a transparent glass plate was provided instead of the polarizing sheet. Specifically, first, blue LED elements (blue LED arrays) arranged in an array form at a pitch of 3 mm on a reflection sheet were used as a light source and a reflection sheet, and two or three sheets of the light diffusion sheet according to Examples 1 to 6 and Comparative Example were laminated and disposed thereon with the first surface (the surface on which substantially inverted quadrangular pyramidal (inverted pyramidal) recesses had been formed) facing toward the light source, and further, a quantum dot sheet (QD sheet manufactured by FUJIFILM Corporation) was disposed as a color conversion sheet on the light diffusion sheets. On the color conversion sheet, two prism sheets arranged such that the grooves were orthogonal to each other were placed, and a transparent glass plate was placed thereon in order to inhibit floating of the sheets, thereby assembling a backlight unit. Luminance of light emitted from the backlight unit in a direction perpendicular to the transparent glass plate (a direction from the blue LED array toward the transparent glass plate) was measured using a luminance meter (a two-dimensional luminance colorimeter UA-200 manufactured by Topcon Technohouse Corporation). In this way, a two-dimensional luminance distribution image was obtained. Next, the two-dimensional luminance distribution image obtained was subjected to correction for a variation in the light emission intensity of the respective blue LED elements and filtering processing for inhibiting bright spot/dark spot noises caused by foreign matters and so on. Then, for the luminance of all pixels, an average value (cd/m2) and a standard deviation were calculated. From the average value and standard deviation of luminance thus calculated, in-plane uniformity of luminance (=average value of luminance/standard deviation of luminance) was further calculated.

Figure 7:
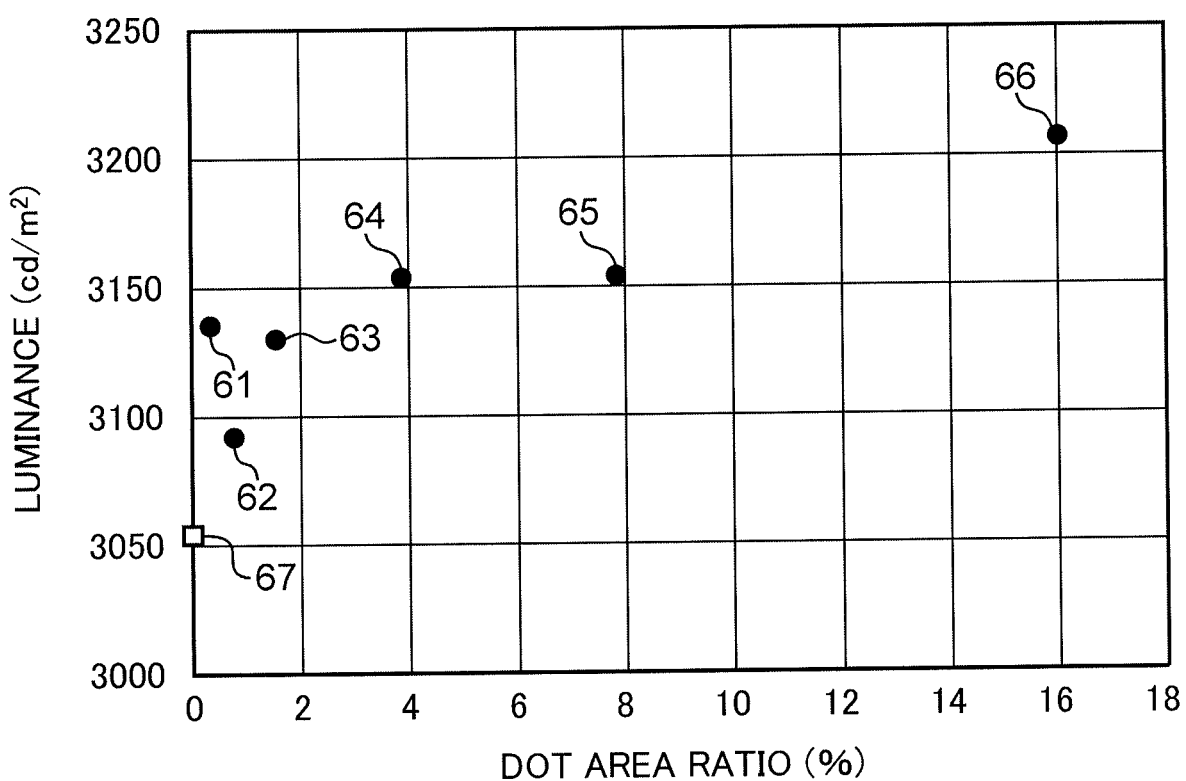
FIG. 7 is a graph showing evaluation results using the respective light diffusion sheets according to Examples and the Comparative Example.
Figure 8:
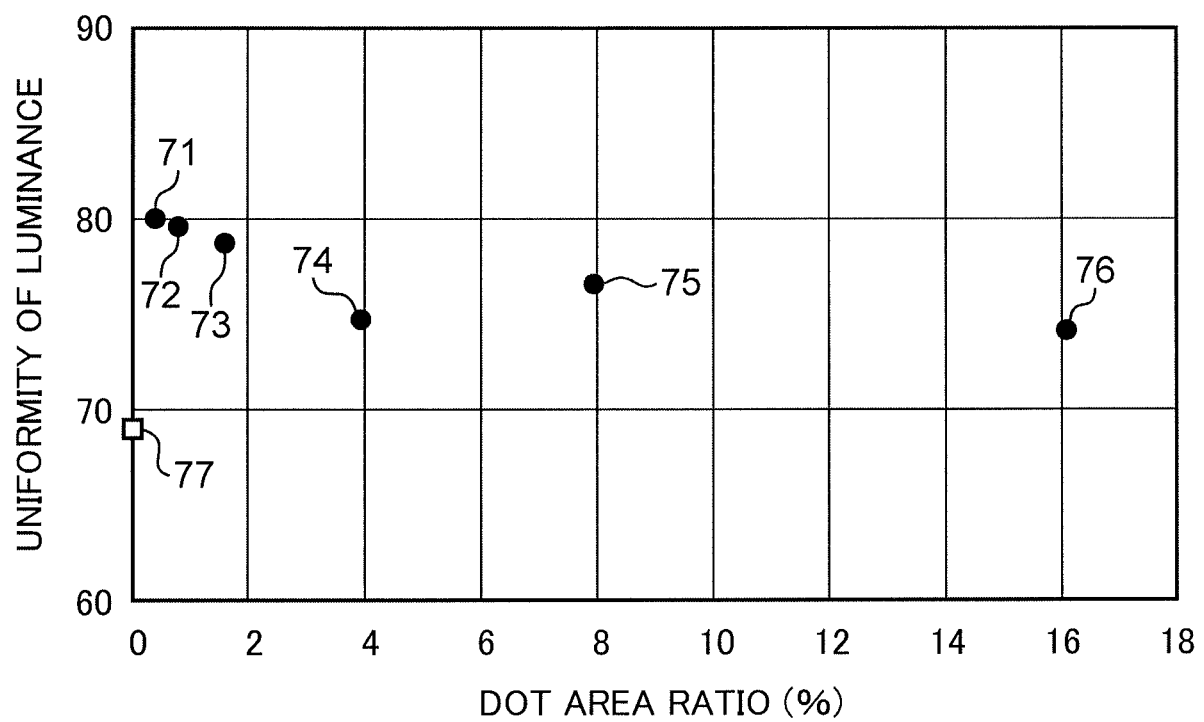
FIG. 8 is a graph showing evaluation results using the respective light diffusion sheets according to the Examples and Comparative Example.
Figure 9:
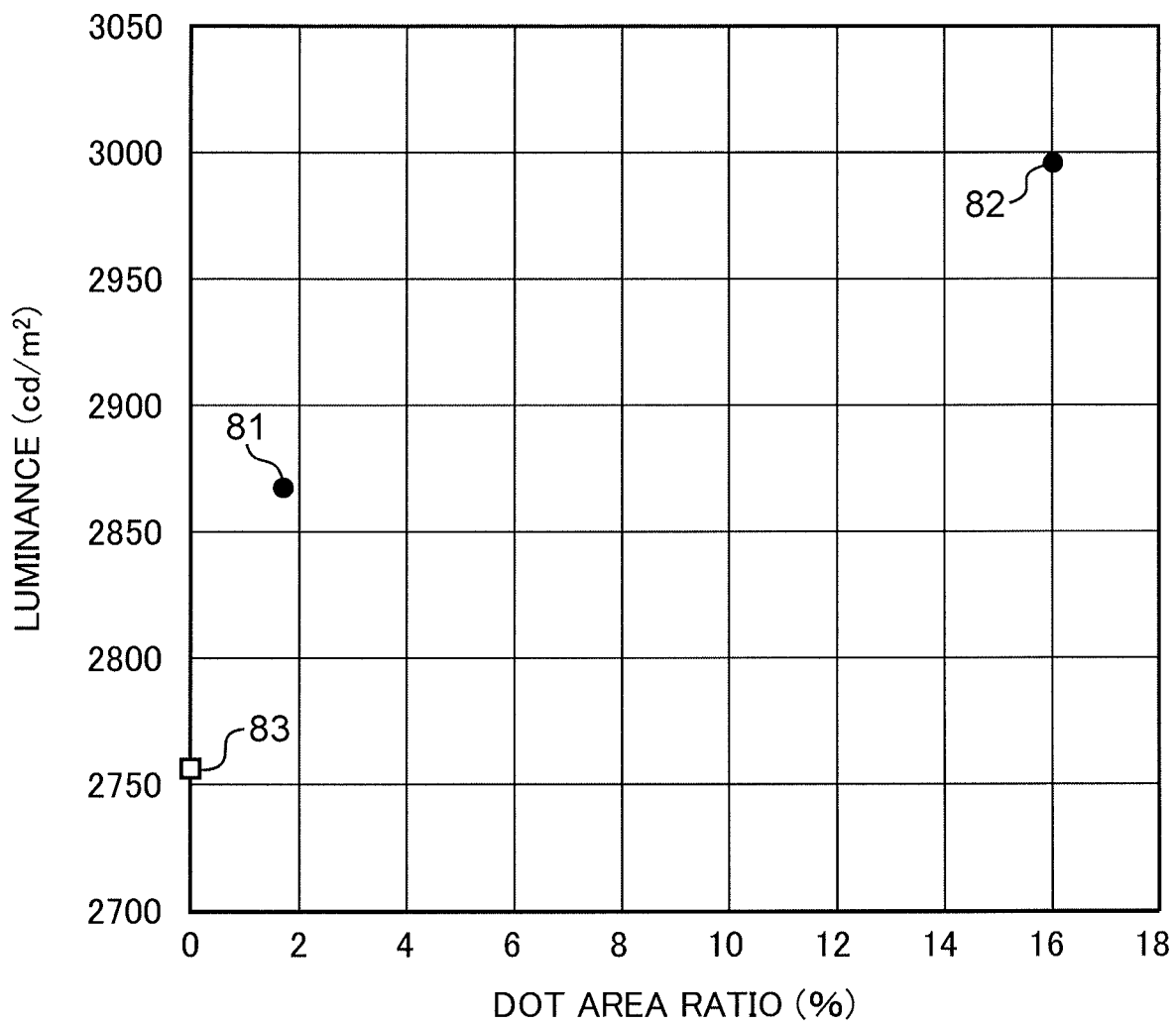
FIG. 9 is a graph showing evaluation results using the respective light diffusion sheets according to the Examples and Comparative Example.
Figure 10:
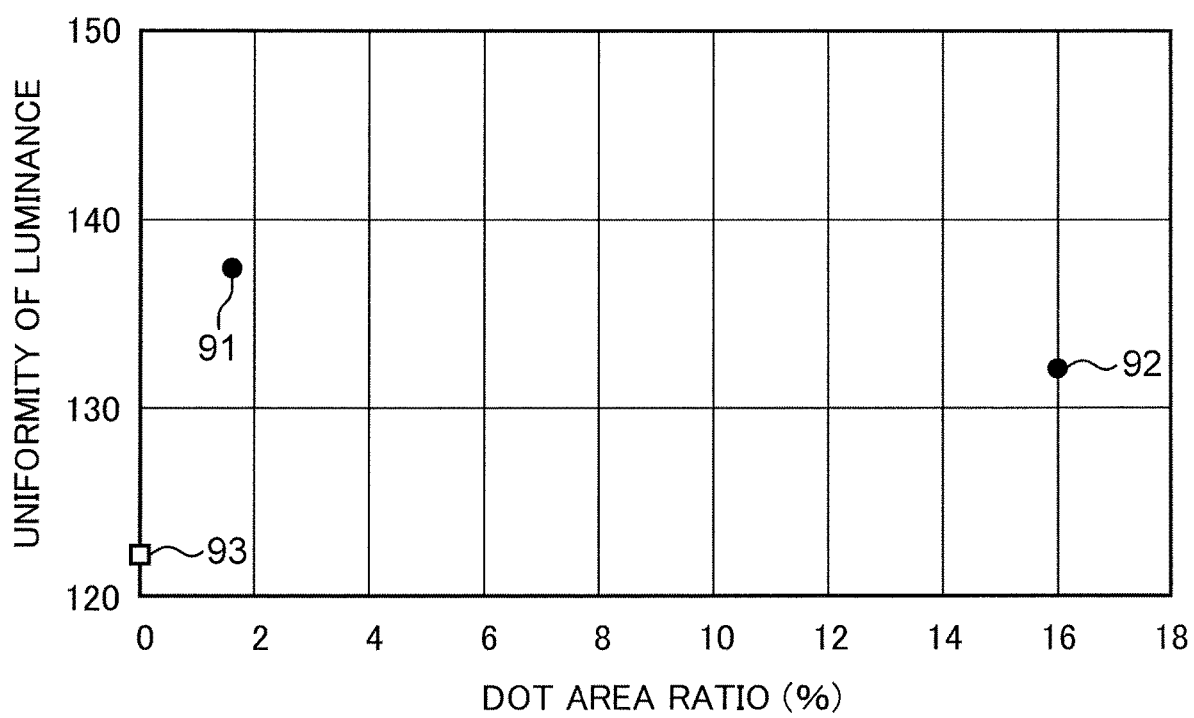
FIG. 10 is a graph showing evaluation results using the respective light diffusion sheets according to the Examples and Comparative Example.

The obtained results are shown in FIGS. 7 to 10. FIGS. 7 to 10 are graphs showing evaluation results using the respective light diffusion sheets according to Examples and Comparative Example. FIG. 7 shows results of luminance in the cases of laminating two light diffusion sheets; plots 61 to 66 show the results using the light diffusion sheets according to Examples 1 to 6, and plot 67 shows the result using the light diffusion sheet according to Comparative Example. FIG. 8 shows results of in-plane uniformity of luminance in the cases of laminating two light diffusion sheets; plots 71 to 76 show the results using the light diffusion sheets according to Examples 1 to 6, and plot 77 shows the result using the light diffusion sheet according to Comparative Example. FIG. 9 shows results of luminance in the cases of laminating three light diffusion sheets; plots 81 and 82 show the results using the light diffusion sheets according to Examples 3 and 6, respectively, and plot 83 shows the result using the light diffusion sheet according to Comparative Example. FIG. 10 shows results of in-plane uniformity of luminance in the cases of laminating three light diffusion sheets; plots 91 and 92 show the results using the light diffusion sheets according to Examples 3 and 6, respectively, and plot 93 shows the result using the light diffusion sheet according to Comparative Example.

As can be seen from FIGS. 7 to 10, in the cases of using a light diffusion sheet including a plurality of projections (including a plurality of projections capable of transmitting light provided apart from each other) on the surface (the second surface) opposite from the surface on which substantially inverted quadrangular pyramidal (inverted pyramidal) recesses were formed (the light diffusion sheet according to any of Examples 1 to 6), luminance was high and in-plane uniformity of luminance was also high as compared with the case of using the light diffusion sheet including a layer covering the second surface (the light diffusion sheet according to Comparative Example). From this fact, it has been found that by forming the recesses on one surface and providing the projections on the other surface, it is possible to sufficiently inhibit a decrease in luminance caused by transmission of light through a light diffusion sheet, and further, as a result of the transmission of light through a light diffusion sheet, in-plane uniformity of the luminance can be enhanced. In addition, as can be seen from FIGS. 7 to 10, in the cases of using the light diffusion sheets according to Examples, the luminance was higher and the in-plane uniformity of the luminance was also higher than those in the case of using the light diffusion sheet according to Comparative Example, regardless of the area ratio (dot area ratio) of the projections. In addition, it has been found that, even in the cases where two light diffusion sheets are laminated and used (FIGS. 7 and 8) or in the cases where three light diffusion sheets are laminated and used (FIGS. 9 and 10), the luminance is high and the in-plane uniformity of the luminance is enhanced by using the light diffusion sheets with the recesses formed on one surface and the projections provided on the other surface.

This application is based on Japanese Patent Applications No. 2021-097155 filed on Jun. 10, 2021 and No. 2022-078307 filed on May 11, 2022, the contents of which are incorporated in the present application.

In order to embody the present invention, the present invention has been appropriately and sufficiently described through the embodiments, but it should be recognized that modifications and/or improvements of the embodiments can easily be made by those skilled in the art.

Therefore, as long as modifications or improvements carried out by a person skilled in the art do not depart from the scope of the claims described in the patent claims of the present invention, these modifications or improvements are interpreted as being encompassed by the scope of the claims.

INDUSTRIAL APPLICABILITY

The present invention provides a light diffusion sheet capable of sufficiently inhibiting a decrease in the luminance of transmitted light and also enhancing in-plane uniformity of the luminance. In addition, the present invention provides a light diffusion sheet laminate in which the light diffusion sheet is laminated, a backlight unit including the light diffusion sheet, and a liquid crystal display device including the backlight unit.

The invention claimed is:
1. A backlight unit, comprising:
a plurality of light sources; and
a light diffusion sheet, including a first surface on which a plurality of recesses that diffuse light are formed; and a second surface on which a plurality of projections that can transmit light are provided apart from each other, wherein an area occupied by the projections is 0.1 to 30% with respect to an entire area of the second surface, and wherein the light diffusion sheet is arranged with the first surface facing toward the plurality of light sources.

2. The backlight unit according to claim 1, wherein the plurality of projections are spaced apart from each other in a form of islands.

3. The backlight unit according to claim 1, wherein each of the projections has a hemispherical shape.

4. The backlight unit according to claim 1, wherein an average height of the projections is 1 to 1000 μm.

5. The backlight unit according to claim 1, wherein a surface other than the projections in the second surface is a flat surface.

6. The backlight unit according to claim 1, wherein each of the recesses has a substantially inverted polygonal pyramidal shape.

7. The backlight unit according to claim 1, wherein each of the recesses has a substantially inverted quadrangular pyramidal shape.

8. The backlight unit according to claim 1, wherein
the light diffusion sheet includes a plurality of light diffusion sheets in layers, and
surfaces of the light diffusion sheets arranged facing toward the plurality of light sources are same.

9. The backlight unit according to claim 1, wherein the plurality of light sources are arranged apart from each other.

10. The backlight unit according to claim 1, further comprising a reflection sheet that reflects light emitted from the plurality of light sources,
wherein the plurality of light sources are arranged apart from each other on a surface of the reflection sheet on a side where the light diffusion sheet is located.

11. The backlight unit according to claim 1, wherein each of the light sources is a light emitting diode element that emits blue light.

12. A liquid crystal display device, comprising:
the backlight unit according to claim 1; and
a liquid crystal panel.

* * * * *